Dec. 20, 1955     E. F. NICHOLS     2,727,494
FLUID PRESSURE MOTOR
Filed July 13, 1951
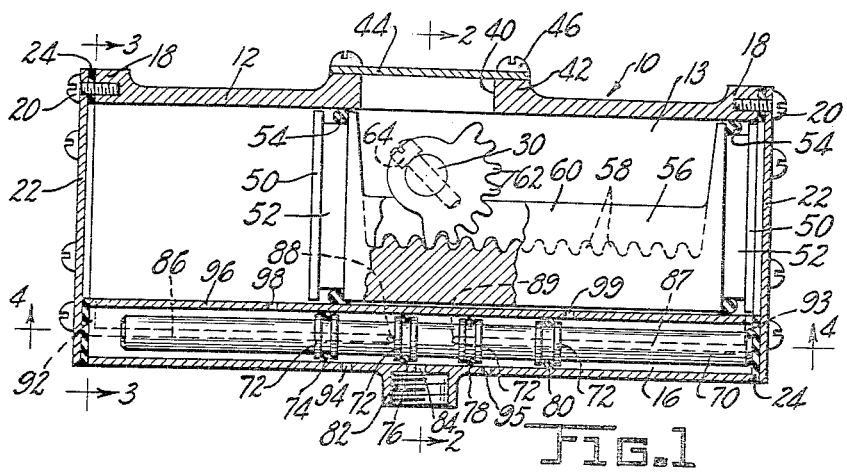
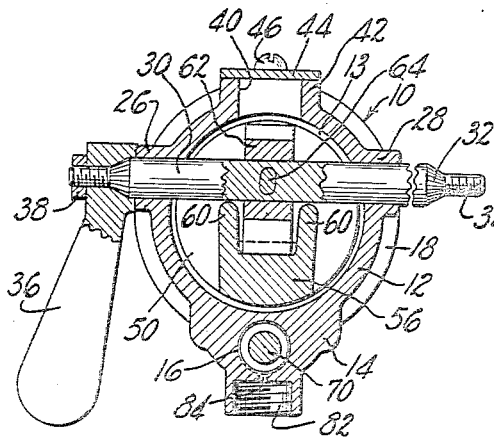
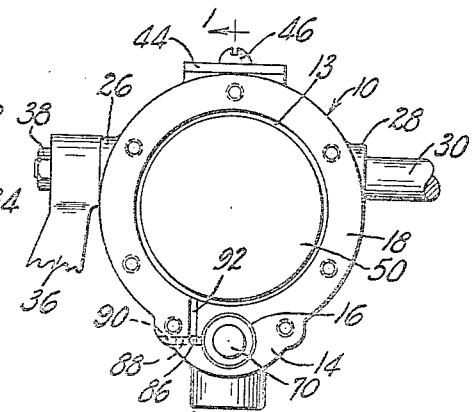
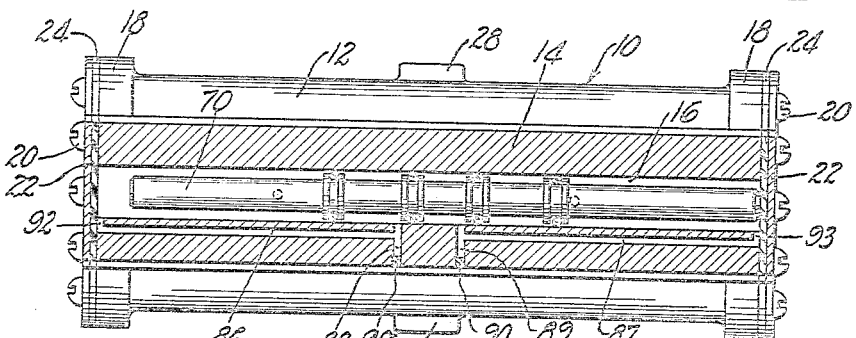
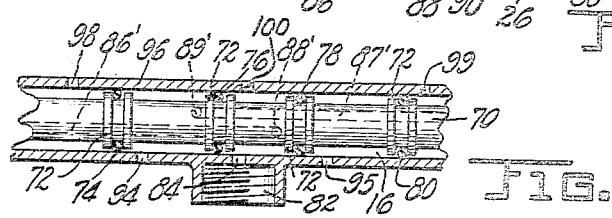
INVENTOR.
ELTON F. NICHOLS
BY Oltsch + Knoblock
ATTORNEYS

United States Patent Office 2,727,494
Patented Dec. 20, 1955

2,727,494

FLUID PRESSURE MOTOR

Elton F. Nichols, Michigan City, Ind., assignor to Charles A. Sprague, Michigan City, Ind.

Application July 13, 1951, Serial No. 236,651

8 Claims. (Cl. 121—150)

This invention relates to improvements in fluid pressure motors, and more particularly to fluid pressure motors of the reciprocating type which are adapted for use upon automobiles to drive windshield wipers.

Reciprocating fluid pressure motors customarily include at least three primary operating parts, that is, a pressure responsive reciprocating or oscillating part, valve mechanism for controlling the flow of fluid to and from the pressure responsive parts, and a mechanical connection between the pressure responsive part and the valve means which serves to actuate the valve by changing its position or setting as the pressure responsive part nears the end of each stroke. The mechanical connection or valve actuator must be a lost motion device so that it does not affect the setting of the parts during the major portion of each stroke. Other requirements for such a valve actuator are that it must have a quick throw, must be reversible, and must have only two operative positions. A mechanical connection device or valve actuator is subject to wear and failure, and its fabrication and assembly with other parts of a fluid pressure motor during manufacture constitute a substantial proportion of the total items or factors which determine the cost of manufacture of the device.

The primary object of this invention is to simplify the construction and reduce the cost of manufacture of the fluid pressure motor by so arranging a fluid pressure responsive member and valve means with respect to the fluid passages in the motor housing which constitute a fluid circulating system as to obviate the necessity for a mechanical valve actuator.

A further object is to provide a device of the character having casing means with a valve chamber and a second or working chamber in which, respectively, a control valve and a pressure responsive member shift bodily, and in which each of said members responds to fluid pressure as exerted thereagainst and directed through passages controlled by the other.

A further object is to provide a device of this character which is simple in construction, comparatively inexpensive, and in which the number of working or moving parts is reduced, compared to previous constructions.

Other objects will be apparent from the following specification.

In the drawing:

Fig. 1 is a longitudinal sectional view taken on line 1—1 of Fig. 3.

Fig. 2 is a transverse sectional view taken on line 2—2 of Fig. 1.

Fig. 3 is a transverse sectional view taken on line 3—3 of Fig. 1.

Fig. 4 is a longitudinal sectional view taken on line 4—4 of Fig. 1.

Fig. 5 is a fragmentary view similar to Fig. 1 and illustrating a modified embodiment of the invention.

Referring to the drawing which illustrates preferred embodiments of the invention, the numeral 10 designates a housing. As here illustrated, the housing is unitary and is of generally elongated, substantially cylindrical form, being provided with a cylindrical body portion 12 having a longitudinal thickened wall portion 14. In the thickened portion 14 is formed a cylindrical chamber 16, preferably extending full length. The housing 10 may be of any suitable form, and may be formed in two parts each including one of the chambers 13 and 16. The housing will preferably be provided with end flanges 18 into which may be anchored securing means, such as screws 20, which serve to secure end plates 22 in place. Gasket members 24 are preferably interposed between the end plates 22 and the adjacent ends of the housing 10 so as to seal the main cavity 13 of the cylindrical body 12 and the secondary cavity or chamber 16.

The body 10 will preferably be provided with a pair of axially aligned collars or sleeves 26 and 28 adapted to journal a shaft 30. The shaft 30 is preferably provided at one end with an anchor surface 32 which is preferably serrated and which may be tapered as illustrated, and which is adapted to be gripped by a windshield wiper blade-mounting arm (not shown). The anchor surface 32 may be positioned inwardly from a threaded end portion 34 adapted to mount a lock nut for holding the windshield wiper arm upon the part 32. The opposite end of the shaft 30 may mount a hand lever 36 held in place by a nut 38. It will be understood, however, that the use of the lever 36 is optional. The collars 26, 28 are so positioned that the shaft 30 will be offset from the longitudinal axis of the chamber 13 and will extend transversely thereacross.

An access opening 40 may be provided in the body part 12 adjacent to and between the sleeves 26 and 28 and preferably at the longitudinal center of the body. The access opening 40 is preferably outlined by an outwardly projecting flange 42 and is spanned by a closure plate 44 secured to the shoulder 42 by securing means 46, such as screws.

A pressure responsive member in the nature of a double-ended piston unit is shiftable in the working chamber 13 of the housing. This unit may take any form found suitable, and, as here illustrated, comprises a pair of opposed end members 50, each having a circumferential groove 52 formed therein to receive an annular resilient sealing member 54 of well known type, one form of which is commonly known as an "O-ring." The end members 50 may have clearance in the chamber 13, and the sealing action at each is provided solely by the sealing members 54 which are retained in their grooves and prevent the leakage therepast of fluid, such as air or gas.

A central longitudinal part 56 interconnects the two end parts 50, the same being preferably of channel shape in cross-section, as illustrated in Fig. 2. The median portion of the longitudinal connector 56 is provided with teeth 58 and defines a rack. Flanges 60 are located at opposite sides of the rack for purposes to be described. A gear 62, preferably mutilated or of partial character only, is fixedly anchored to the shaft 30 by a set screw or other locking member 64. Consequently, as the piston unit shifts or reciprocates in the chamber 13, the meshing of the gear 62 with the rack 58 will cause the shaft 30 to be rocked or rotated for a part only of one revolution, thus actuating the member to be driven thereby, such as a windshield wiper blade or arm.

A valve unit 70 of the spool type is shiftable and the valve chamber 16, for example, is reciprocable endwise. The spool 70 is of a length slightly less than the overall length of the chamber 16 and has a plurality of enlargements or shoulders 73 formed thereon in longitudinally spaced relation and each provided with a circumferential groove. These circumferential grooves mount and retain annular resilient sealing members 74, 76, 78 and 80, respectively. In the form shown, the seals 76 and 78 are equispaced from and positioned at opposite sides of the longitudinal center of the spindle 70, and the seals 74 and 80 are likewise equally spaced from the opposite ends of the spindle 70.

At its longitudinal projection 14 the housing 10 is provided with a socket 82 adapted for connection with a fitting for a conduit leading to a pressure control or generating unit. This pressure control unit may constitute an air compressor constituting a source of supply of compressed air, or it may consist of a vacuum pump adapted to create a sub-atmospheric pressure. I prefer to employ the device with a compressor. An aperture 84 is formed in the wall of the housing which separates the socket 82 from the chamber 16, and this conduit admits the passage of fluid between said socket and chamber. A pair of elongated passages 86 and 87 connect the chambers 13 and 16, and, as here shown, are formed in the longitudinal boss 14 and extend lengthwise thereof. The inner end of the passage 86 communicates with a passage 88, and the inner end of the passage 87 communicates with the passage 89. The passages 88 and 89 extend into communication with the valve chamber 16 adjacent and equally spaced from the longitudinal center thereof and are spaced apart a distance substantially equal to the spacing between the seals 76 and 78 of the valve unit. The passages 88 and 89 extend transversely through a wall of the housing and may be sealed by plugs 90 at their outer ends. The plugs 90 may take any form found suitable, such as metal solder or preformed metal parts, and they are so positioned that they prevent the leakage of fluid outwardly through the passages 88 and 89 to atmosphere. The passages 86 and 87 extend to the opposite ends of the housing 10, and grooves 92 and 93 are formed in the opposite ends of the housing 10 in communication with the passages 86 and 87, respectively, and with the opposite ends of the working chamber 13.

In outwardly longitudinally spaced relation to the aperture 84 and the passages 88 and 89, are located apertures 94 and 95. The apertures 94 and 95 are equally spaced from and on opposite sides of the aperture 84 and are positioned longitudinally from that aperture a distance greater than the longitudinal spacing of the apertures 88 and 89 from the aperture 84. A wall 96 separates the work chamber 13 from the valve chamber 16, and apertures 98 and 99 are formed in the wall 96, preferably spaced longitudinally and outwardly from the apertures 94 and 95. Each of the apertures 98 and 99 is spaced from the end wall 22 farthest therefrom a distance slightly greater than the overall length of the piston unit, and more specifically, a distance greater than the spacing between the annular resilient sealing members 54 seating in the annular grooves 52 in the opposite end portions 50 of the piston unit.

Assuming that the device is to be connected to a source of compressed air at its socket 82 and that the parts are in the position illustrated in Fig. 1 at the time a control valve (not shown) is opened to admit a supply of air from said line through the aperture 84 into the valve chamber 16, the operation of the device will be as follows: Fluid under pressure entering the valve chamber 16 at the aperture 84 passes around the valve spool 70 and through the passage 89, 87, 93 for entry into the right-hand end of the working chamber 13. The air under pressure acts against the right-hand end of the pressure responsive unit or double-acting piston to move the same toward the left. As the pressure responsive member so operates, the bodily movement of its rack 58 causes a clockwise rocking movement of the pinion 62 and the shaft 30. The fluid under pressure is prevented from leaking past the right-hand piston part 50 by the annular sealing member 54 thereof. The movement of the piston toward the left causes evacuation of air from the left-hand end of the working chamber through the passage 92, 86, 88 into the valve chamber 16 and thence to the exhaust passage 94. It will be observed in this connection that the aperture 98, in the setting of the parts illustrated in Fig. 1, is open and, consequently, any air under pressure in the left-hand end of the valve chamber 16, that is, between the left end of that chamber and the seal 74, will be reduced to atmospheric value because the left-hand end of the valve chamber is open to atmosphere through the aperture 98, the left-hand end of the working chamber, the passages 92, 86 and 88, the portion of the valve chamber 16 between the seals 74 and 76, and the outlet aperture 94.

Movement of the pressure responsive member to the left continues until the right-hand annular sealing member 54 passes over the aperture 99, thereby opening that aperture 99 into communication with the source of air under pressure. After the right-hand sealing member 54 clears the aperture 99 to open the same at least partially, the fluid under pressure in the device serves a new function by entering the right-hand end portion of the valve chamber 16 to act against the right-hand abutment 72 mounting the seal 80 and thereby bodily shift the valve unit from the position illustrated in Fig. 1 toward the left until the left-hand end of the valve stem 70 bears against the left-hand end wall of the valve chamber 16. The movement of the valve unit in this manner is sufficient to shift the annular sealing member 78 to a position between the apertures or ports 84 and 89 and thereby open the ports 89, 95 into communication. The valve movement also shifts the seal 76 from a position between the apertures or ports 84 and 88 to a position between the ports 88 and 94, thereby closing the communication between the ports 88 and 94 but opening communication between the ports 84 and 88.

With the new or left-hand setting of the valve, assuming operation of the device by means of a supply of air under pressure connected at the socket 82, flow of fluid under pressure is then reversed and passes in the following circuit: from passage 84, through the valve chamber 16 to the passage 88, thence through the passages 86 and 92 into the left-hand end of the working chamber 13 where it acts upon the left-hand piston unit 50 and tends to move the pressure responsive assembly toward the right. At the same time the air under pressure in the right-hand end of the valve chamber 16, which served to shift the valve unit to the new left-hand setting, will be evacuated through the port 99, which then will be uncovered, the right-hand end of the working chamber 13, the passages 93, 87 and 89, the portion of the passage 16 between the seals 78 and 80, and the outlet aperture 95. In this way the pressure in the right-hand end of the valve chamber will be reduced to atmosphere. Air or other fluid in the right-hand end of the working chamber 13 between the right-hand end of the piston unit and the right-hand end wall 22 will be evacuated through the same path as the pressure responsive unit moves to the right. Movement of the pressure responsive unit to the right will continue until the port 98 is uncovered, thereupon the fluid under pressure will serve the dual function of continuing movement of the piston unit toward the right and of moving the valve assembly to the right to the position illustrated in Fig. 1, thereby returning the setting of the valve seals 74, 76, 78 and 80 to the Fig. 1 position, thus again reversing the device and conditioning it for movement to the left.

It will be apparent from the foregoing description of the operation of this device that there is no mechanical connection between the pressure responsive member in the working chamber and the valve unit in the valve chamber, and that, instead, fluid pressure is utilized to shift the valve as well as the fluid pressure member in the working chamber. It is also apparent that the timing of the operation of each of the two fluid pressure responsive parts is controlled by the position of the other of said fluid responsive parts. Thus the main fluid responsive working or piston unit, having a greater stroke than the valve, must move to a point closely approaching the end of that stroke for any given setting of the valve before it uncovers the port which permits the pressure-responsive change of setting of the valve unit to cause reversal of the direction of flow of fluid under pressure in the operating circuit and resultant reversal of the direction of operation of the main or working piston unit of the device. It will be apparent, however, that the stroke of the working piston will be controlled by the spacing between the ports 98 and 99. The location of the ports 98 and 99 also determines the portion of the working chamber in which the piston unit will reciprocate. It is apparent, therefore, that if the ports 98 and 99 are not arranged symmetrically, that is, if opposite ports are located at different distances from the opposite ends of the working chamber, the piston unit will move through a path such that it approaches at one end of its stroke closer to one end wall 20 than its approach toward the opposite end wall in its opposite stroke. These characteristics will permit each unit to be constructed to serve the purposes best suited for the particular installation. At the same time it will be possible to vary the stroke of the wiper blade upon the windshield wiper, if that is desired, by releasing the set screw or other securing member 64 and changing the orientation of the shaft 30 with respect to the pinion 62 and then retightening said set screw or locking member 64.

While the device is best suited for use with compressed air, it will be apparent that it will operate also, but in a reverse fashion, when the socket 82 is connected to a source of suction, that is, to a line at sub-atmospheric pressure. In this connection, however, a slight change in the location of the passages 86, 88 and 89 is necessary, as illustrated in Fig. 5, wherein the left-hand longitudinal passage 86' is illustrated as extending to a port 88' located slightly to the right of the longitudinal center of the valve chamber 16, that is, to the right of the port or aperture 84. Similarly, the right-hand longitudinal passage 87' is illustrated as extending to a port 89' located at the left of the longitudinal center of the valve chamber 16 and to the left of the aperture 84.

The operation of the modified embodiment of the invention illustrated in Fig. 5, when the socket 82 is connected with a source of fluid under sub-atmospheric pressure, is as follows: Assuming that the valve is in the position illustrated in Fig. 5, air under pressure enters at the port 94 and passes through the portion of the valve chamber 16 between the seals 74 and 76 to enter the passage 89'. From the passage 89' the air at atmospheric pressure extends through the longitudinal passage 87' to the passage 93 and the right-hand end of the working chamber 13 where it acts upon the pressure unit to cause it to move from a position, as illustrated in Fig. 1, toward the left. At the same time air in the left-hand end of the working chamber 13 is evacuated through the passage 92, 86' and 88' into the central portion of the valve chamber 16 from which it is discharged through the aperture 84 into the line connected at the socket 82. When the seal at the right-hand end of the unit uncovers the port 99, the air under atmospheric pressure enters the right-hand end of the valve chamber 16 and urges the valve unit bodily toward the left to the limit permitted, thereby placing the aperture 84 in communication with the aperture 89' and placing the aperture 88' in communication with the atmospheric port 95. Thereupon the action of the device is reversed so that air at atmospheric pressure entering port 95 enters passages 88', 86' and 92 into the left-hand end of the working chamber 13, and air under sub-atmospheric pressure which is drawn through aperture 84 is derived from or placed in communication with the right-hand end of the working chamber through the passages 89', 87' and 93. Therefore, it is apparent that by a slight change in location of the passages, as illustrated in Fig. 5, this device can be operated when connected to a source of suction, and possesses all of the advantages that can be secured when the device is operated by connection of the socket 82 thereof with a source of air at a pressure above atmospheric pressure.

Operation of the device by a difference in pressure between atmospheric pressure and sub-atmospheric pressure can be effected with the device constructed as illustrated in Fig. 1 by using port 84 as the high pressure port and ports 94 and 95 as the low pressure ports. In other words when ports 94 and 95 are connected to a suction line and port 84 is open to atmospheric pressure, the device will operate satisfactorily when the arrangement of the ports and the construction of the valve is the same as that illustrated in Fig. 1. It will be apparent that this can be accomplished easily by the provision of a manifold communicating with the ports 94 and 95 and in turn connected to a line leading to a suction pump. As well understood in the art, such a manifold may be formed integrally in the valve housing or it may be provided as a separate part.

In cases where the device is to operate in response to the difference in pressure between atmospheric pressure and sub-atmospheric pressure, a problem exists which is not present when the device operates in response to difference in pressure between compressed air and air at atmospheric pressure. That problem consists of maintenance of a sub-atmospheric pressure condition in the working chamber 13 between the two annular seals 54 carried by the spaced cylindrical end members 50 of the piston unit. This is necessary to insure proper positioning of the valve stem 70 as by avoiding entry of air at atmospheric pressure into the right-hand end of the valve chamber 16 through the port 99 while the valve is in the position illustrated in Fig. 1. Various means may be employed to provide such a pressure condition. One such means would consist of providing an airtight seal between the cover plate 44 and the housing 10 at the access opening 40 and between the collars 26, 28 and the shaft 30. A device, provided with such seals and having air evacuated from the portion between the seals 54 after assembly of the device, would maintain a sub-atmospheric condition between the seals 54 as long as the casing 10 of the working unit remained leakproof. Such construction would be subject to certain inherent disadvantages, as will be apparent, and, in particular, would be subject to objectionably high cost of manufacture and to disability in the event even a slight leak were to develop which would result in the existence of an atmospheric pressure condition between the two seals 54.

Avoidance of some of the expense entailed in the procedure just above mentioned for maintaining a sub-atmospheric condition between the seals 54, and particularly avoidance of the step or operation of evacuating the portion of the working chamber 13 between the seals 54 after assembly of the device and before use thereof, may be accomplished by a simple expedient. Thus, if the central portion of the working chamber 13, that is, the portion between the innermost positions of the two seals 54, is placed in communication with the suction line, a satisfactory operation will result and a sub-atmospheric pressure condition in the working chamber 13 between the seals 54 will be insured at all times when the device is in condition for operation. The working chamber 13 may be connected in communication with the suction line by a manifold (not shown), as will be apparent. Another means of accomplishing this purpose is to provide a port 100 in the wall 96 separating the chambers 13 and 16 in such a position that it always remains in communication with the suction line. Thus, as illustrated in Fig. 5, the port 100 is shown as located in the same longitudinal position with respect to the valve unit and the valve chamber 16 as is the port 84. Consequently, the movement of the valve stem and its seals between its two operative positions will not affect or change the pressure condition at the port 100, and a sub-atmospheric pressure condition will exist in the part of working chamber 13 between the seals 54 at all times that a sub-atmospheric pressure condition exists in the line connected with the port 84. The same expedient may also be used in cases where the Fig. 1 construction is converted for connection and operation by a source of sub-atmospheric pressure, but in this instance the port or ports compared to the port 100 of Fig. 5 should be located in the same longitudinal orientation as is one of the two ports 94 and 95. In the latter connection, a preferred construction would entail the formation of two ports compared to the port 100, one in the same longitudinal orientation as the port 94, and the other in the same longitudinal orientation as the port 95.

While the preferred embodiments of the invention have been illustrated herein, it will be understood that changes may be made in the construction within the scope of the appended claims without departing from the spirit of the invention.

I claim:

1. A fluid pressure motor comprising a housing having a valve chamber and a working chamber, a valve shiftable in said valve chamber, a pressure responsive member shiftable in said working chamber, said housing having a fluid intake and a pair of fluid outlets each communicating with said valve chamber, a pair of passages each communicating with said valve chamber adjacent to said inlet and an outlet, said passages communicating with opposite portions of said working chamber, said valve controlling fluid flow between said inlet, said outlets and said passages, and ports connecting said chambers and spaced from the opposite ends thereof, said pressure responsive member controlling fluid flow through said ports, said valve chamber being cylindrical and said valve constituting a spool having a plurality of longitudinally spaced circumferential seals, the end seals of said valve being interposed between the adjacent port and the adjacent outlet in all positions of said valve.

2. A fluid pressure motor comprising a power unit having a working chamber shiftably receiving an oscillatable pressure responsive element, a valve unit having a chamber shiftably receiving a pressure responsive valve member having two operative positions, and a fluid circulating system having inlet and outlet ports and passages connecting said chambers with each other, said valve connecting one passage to inlet and the other to outlet in each operative position and reversing said connections when shifted from one position to the other, said chambers having a common wall and a second pair of passages connecting said chambers, said second passages being formed in said common wall and positioned adjacent to but outwardly of the innermost operating positions of the opposite ends of said pressure responsive element whereby each is uncovered to admit fluid under pressure into said valve chamber to shift said valve member as the working element approaches an end of its stroke, said second passages being positioned outwardly of the adjacent portion of said valve member in all positions thereof.

3. A fluid pressure motor comprising a power unit having a working chamber shiftably receiving an oscillatable pressure responsive element, a valve unit having a chamber shiftably receiving a reciprocable spool valve member having two operative positions, said valve member having a plurality of spaced circumferential seals intermediate its length, inlet and outlet ports communicating with the intermediate portion of said valve chamber in longitudinally spaced relation, a pair of passages each communicating with the intermediate portions of said valve chamber spaced longitudinally from each other and from said inlet and outlet ports, said passages communicating with opposite ends of said working chamber, and a pair of ports each connecting an intermediate portion of said working chamber with an end portion of said valve chamber spaced longitudinally from the aforementioned ports and passages and outwardly of the respective adjacent end seals of said valve in all positions of the valve.

4. A fluid pressure motor comprising a power unit having a working chamber shiftably receiving a reciprocable pressure responsive element having spaced head portions and an intermediate portion, a valve unit having a chamber shiftably receiving a pressure responsive valve member, a fluid circulating system including an inlet opening and a pair of outlet openings and a pair of passages connecting the opposite ends of said working chamber with said valve chamber and controlled by said valve member for alternate communication with said inlet and outlet openings, and passage means connecting said chambers and isolated at all times from said outlet openings by said valve, said last named passage means being controlled by said pressure responsive element to admit fluid under pressure from said working chamber to said valve chamber for actuation of said valve member as said power element approaches one end of its movement in its chamber, a driven member journaled in said working chamber transverse of and intermediate the length of said working chamber, and a drive connection between said driven member and the intermediate portion of said pressure responsive element.

5. A pneumatic motor comprising a housing having a valve chamber and a working chamber, said chambers being elongated and juxtaposed, a spool valve shiftable in said valve chamber between two operative positions, a pressure responsive member oscillatable in said working chamber between opposite limit positions, and a fluid circulating system including inlet and outlet openings communicating with said valve chamber, and two pairs of passages connecting said chambers, the passages of one pair being controlled by said valve and connecting the opposite ends of said working chamber outwardly of the limit positions of said pressure responsive member alternately with said inlet and outlet ports, the passages of the other pair being controlled by said pressure responsive member to selectively admit fluid into said valve chamber to shift said valve as said pressure responsive member approaches each limit position said spool valve having four longitudinally spaced seals located to alternately connect the passages of said first pair with said inlet and outlet openings and to isolate the passages of the other pair from the adjacent outlets at all times.

6. A fluid pressure motor as defined in claim 2, adapted to operate in response to a pressure difference between atmospheric pressure and sub-atmospheric pressure, wherein said pressure responsive element has longitudinally spaced seals, said inlet and outlet ports including two inlet ports connected to atmosphere and an outlet port connected to a source of sub-atmospheric pressure, and passage means adapted to connect to a sub-atmospheric pressure source the central portion of said working chamber located between the innermost positions of the seals of said pressure responsive element, the passages of said second pair serving to admit atmospheric pressure to said valve chamber for shifting said valve member as the working element approaches the end of its stroke.

7. A fluid pressure motor as defined in claims 3 and 6, wherein the passage means communicating with the central portion of said working chamber also communicates with a portion of said valve chamber which is in continuous communication with said outlet port and a sub-atmospheric pressure source.

8. A fluid pressure motor comprising a housing having a valve chamber and a working chamber, a valve shiftable lengthwise in said valve chamber between two operative positions and having a plurality of seals spaced lengthwise and spaced from the opposite ends of the valve, a pressure responsive member oscillatable in said working chamber between opposite limit positions, and a fluid circulating system including inlet and outlet openings communicating with and spaced lengthwise of said valve chamber, a pair of passages spaced lengthwise from said inlet and outlet and controlled by said valve and selectively communicating with said inlet and outlet and with an end portion of said working chamber outwardly of the limit position of said pressure responsive member, and a pair of ports each establishing communication between a portion of said valve chamber spaced lengthwise from the aforesaid openings and passages and an end portion of said working chamber inwardly of the limit position of said pressure responsive member in said working chamber, each port being isolated from the adjacent outlet by said valve at all times, said last named ports alternately communicating with said inlet and outlet openings through said working chamber to maintain said valve in operative position by fluid pressure between reversals thereof.

References Cited in the file of this patent

UNITED STATES PATENTS

| Number | Name | Date |
|---|---|---|
| 398,491 | Bromley | Feb. 26, 1889 |
| 409,851 | Marsh | Aug. 27, 1889 |
| 421,355 | Frost | Feb. 11, 1890 |
| 616,973 | Rhodes | Jan. 3, 1899 |
| 632,931 | Weinman | Sept. 12, 1899 |
| 1,666,108 | Phillips, Jr. | Apr. 17, 1928 |
| 2,098,936 | Armstrong et al. | Nov. 16, 1937 |